Dec. 27, 1966  A. C. MORGAN ETAL  3,294,606
METHOD OF MAKING A VULCANIZED WIRE REINFORCED
TIRE BY MEANS OF INDUCTION HEATING
Original Filed June 16, 1961  2 Sheets-Sheet 2
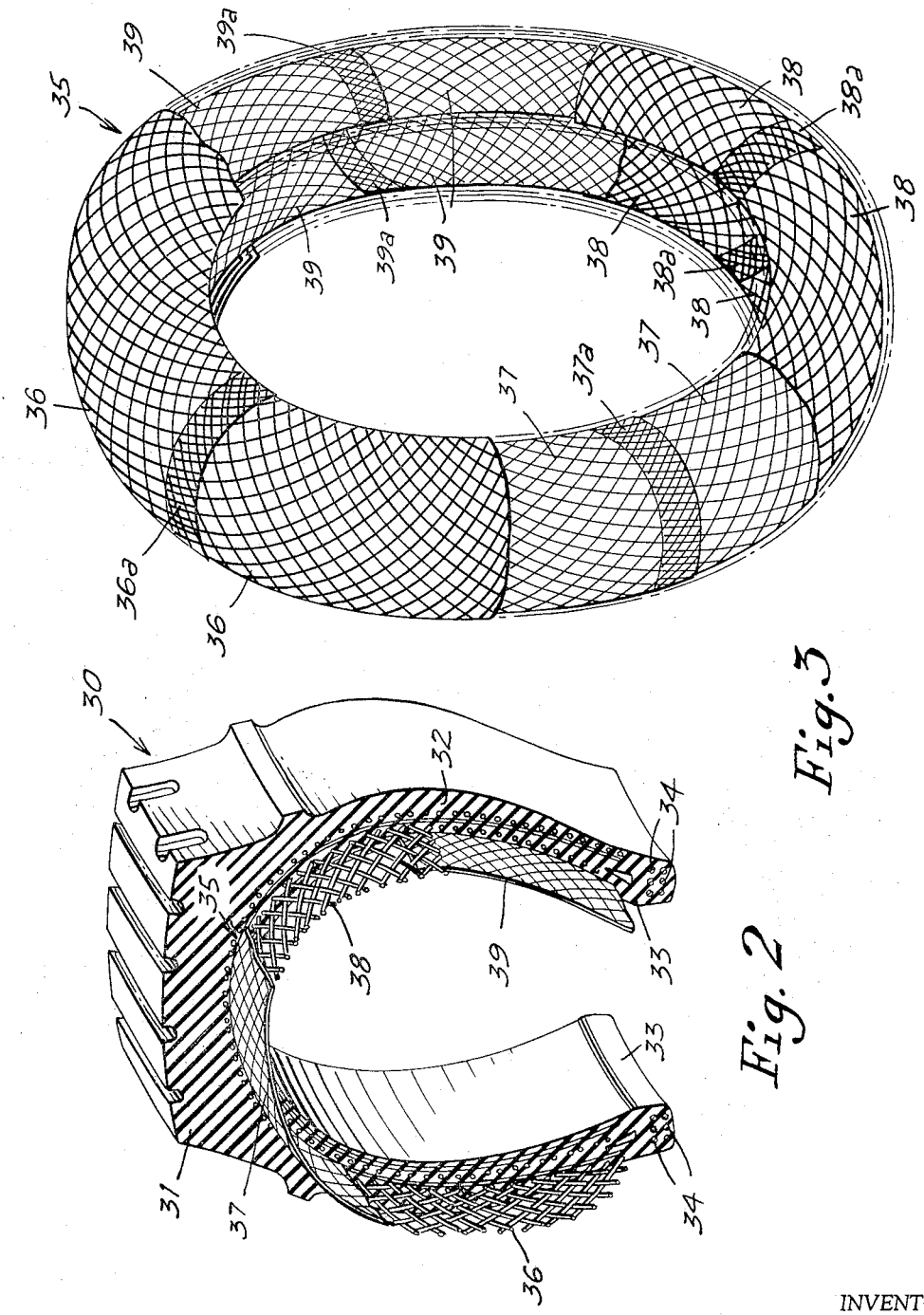
INVENTORS
Allan Clark Morgan,
Richard A. Mezger,
Robert H. Davis
BY 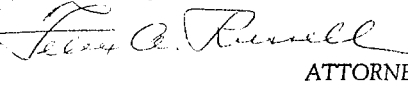
ATTORNEY United States Patent Office 3,294,606
Patented Dec. 27, 1966

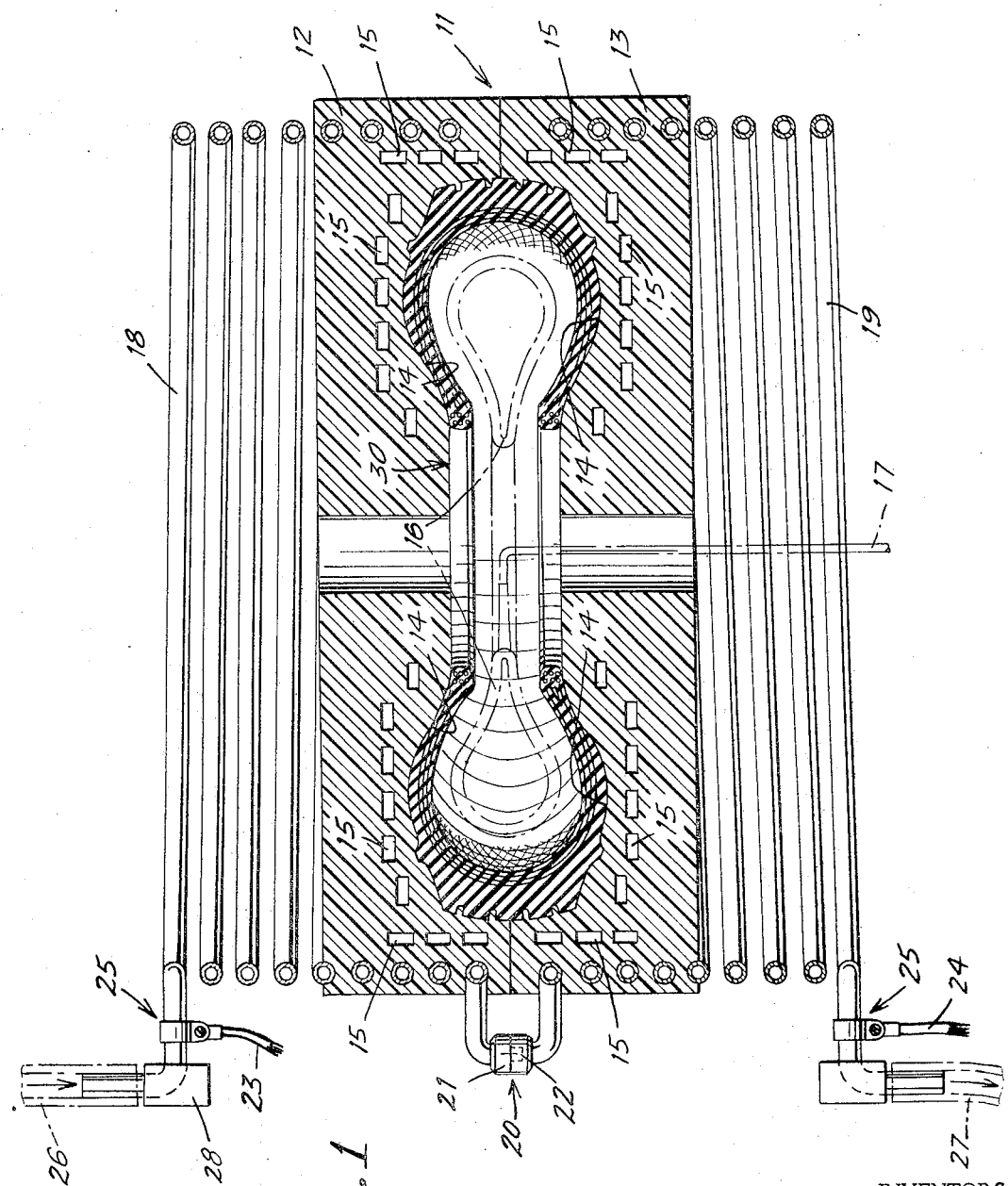

3,294,606
METHOD OF MAKING A VULCANIZED WIRE REINFORCED TIRE BY MEANS OF INDUCTION HEATING
Allan Clark Morgan, Mount Vernon, N.Y. (130 Mount Vernon St., Winchester, Mass. 01890); Richard A. Mezger, Baltimore, Md. (2901 Henderson Ave., Wheaton, Md. 20902); and Robert H. Davis, Main St., Frankford, Del. 19948
Original application June 16, 1961, Ser. No. 117,711. Divided and this application Nov. 16, 1964, Ser. No. 420,236
3 Claims. (Cl. 156—124)

This application is a division of application Serial Number 117,711, filed June 16, 1961, now abandoned.

This invention relates to a wire reinforced tire and method and apparatus for making the same.

Generally the invention pertains to making a pneumatic tire having a tread lamina, and a plurality of alternating laminae of sheet rubber and woven fabrics, at least some of which fabrics are wire screen, by heating the assembled laminae in a mold having a high frequency induction coil associated therewith to induce an internal heating current in the tire-embedded wire fabric laminae for more rapid and more uniform heating of the tire body.

When rubber is cured in a hot mold, there is initially a steep temperature gradient from the surface of the material (in contact with the mold) to its center. As the thickness of the piece increases so does the temperature differential. Reaction rates often vary greatly over a small temperature range. This phenomenon is strikingly exhibited by vulcanization. For example, a rubber that takes ten minutes to vulcanize at 150° C., will take two to three hours to vulcanize at 105° C. The degree of vulcanization or cure greatly affects the properties of the rubber. Properties such as tensile strength and chemical inertness peak when optimum vulcanization conditions are obtained. Since the rate of curing will vary greatly across a section of rubber that is hotter in one portion than in another, an uneven curing results, with attendant undesirable heterogeneity of the properties of the piece being vulcanized.

There are two techniques now practiced industrially to eliminate or at least reduce the effects on rate of cure that standard molding processes bring about: (1) the addition of accelerators which increase the rate of vulcanization at low temperatures, or (2) the extended curing time at low temperatures. The latter method is expensive since it requires a long cycle and the use of accelerators. The former results in a product which is slightly inferior in strength to rubber which is vulcanized with sulfur only. The cost of accelerators is also an important consideration.

No previous work on this subject was found in the literature. Since there is such a dearth of information in this field, several aspects of the subject were studied. First, it was found that no heat is generated in a carbon loaded rubber with induction heating of low frequency (450,000 cycles or less). Second, the heating effected in a sample containing steel wires was rapid and easily controlled.

The practical application of this second observation is in the region of curing specialty tires which use piano wire instead of nylon or rayon for ply cord. This results in an appreciably decreased molding time since the region of the tire containing the wire plys is raised to vulcanization temperatures substantially immediately. The ply region can be cured exactly as desired and the center of the tread area heated much more rapidly, since heat will be generated in the ply region and the distance for heat transfer into the tread area appreciably reduced. An added attraction of this method is the possibility of direct sulfur to metal bonding. This results in the steel and hydrocarbon being linked by primary valence forces via the sulfur atom. Slippage between the wire fabric and the rubber is thus eliminated.

It is accordingly an object of the present invention to provide a method and apparatus for producing stronger and more homogeneous tires by inductively heating reinforcing wire plies embedded therein.

It is another object of the invention to provide such a method and apparatus by which the manufacturing costs are reduced by savings in both curing time and accelerating additives.

It is a further object of the invention to provide a wire reinforced tire in which the wire is coated with a material that reacts with the vulcanizing sulfur to produce a stronger bond between the wire and the embedding rubber.

Other and further objects of the invention will become apparent from a reading of the following specification taken in conjunction with the drawings, in which:

FIGURE 1 is an elevational view, in vertical axial section, of a tire mold embodying the invention, FIGURE 2 is an enlarged perspective view of a transversely cut section of the finished tire, and FIGURE 3 is a perspective view of the superimposed fabric laminae of the ply portion of the tire, the rubber laminae being omitted for clarity.

With reference now to FIGURE 1 of the drawings, the numeral 11 generally designates the vulcanizing mold as a whole. The mold 11 comprises a pair of separable complementary mold sections 12 and 13 defining a toroidal tire-shaped mold cavity 14.

The mold sections 12 and 13 are formed of plastic or other suitable electrically non-conducting material preferably of relatively high thermal conductivity and provided with circumferentially extending steam passages 15 closely surrounding the mold cavity 14 for steam heating of the walls of said cavity in known manner.

An elastic toroidal tube 16 of conventional construction and inflatable and heatable by steam supplied thereto by a flexible steam conduit 17 is employed to simultaneously heat the inner tire surface while forcing the tire body firmly against the surrounding mold surfaces.

The induction coil comprises a pair of helical sections 18 and 19 of copper tubing, the adjacent portions of which are conveniently assembled with the mold sections 12 and 13 by being embedded therein. The adjacent ends of the coil sections 18 and 19 are electrically and mechanically coupled by a metallic connector 20 comprising separable mating parts 21 and 22 fixed to said coils.

High frequency electric current, several kilocycles to several hundred kilocycles, is transmitted to the induction coil 18–19 by leads 23 and 24 electrically connected to the coil ends by conventional connectors and terminals generally designated 25.

The tubtular coil sections 18 and 19 are desirably cooled by air, water or other coolant fluids circulated to and from the same by flexible conduits 26 and 27 coupled to the ends of the coil sections 18 and 19 by electrically insulating connectors 28.

With reference now to FIGURES 2 and 3, the numeral 30 generally designates the tire, consisting of a tread portion 31, outer walls 32, enlarged rim portions 33 reinforced by metallic cables 34 and a ply portion generally designated 35. The tire's ply portion 35 (best illustrated in FIG. 3) is herein disclosed as comprising four reinforcing plies 36–39 of woven fabric bonded together by interleaved laminae of sheet rubber (not indicated), the laminae being fused together into a homogeneous body (including the tread portion 31 and the outer walls 32) by the molding and vulcanizing operation. Said operation results in a unitary tire body having the fabric plies 36–39 and the rim cables 34 embedded therein.

An essential feature of the invention resides in making at least one of the several reinforced plies of steel wire whereby a heating current can be induced in the wire ply by the induction coil 18–19. FIGS. 2 and 3 show the plies 36 and 38 as being of a coarser fabric than plies 37 and 39, with their ends overlapped at 36a and 38a diametrically opposite each other for tire balance.

Either pair or both pairs of plies can be made of wire screen, preferably steel of high tensile strength. Or, as stated above, only one reinforcing ply need be made of electrically conducting material. The overlapping ends 36a and 38a are of such area as to make the contact resistance therebetween of such value as to compensate for the lower circumferential resistance produced by the double ply thickness at the overlap, so as to provide circumferentially uniform $I^2R$ heating values in each metallic ply. Perforated flexible metallic bands of U-shaped cross section could be substituted for the woven wire plies, if preferred.

The alternating plies 37 and 39 have their overlaps 37a and 39a diametrically opposite each other and ninety degrees from the overlaps 36a and 38a for tire balance.

Another important feature of the invention resides in the discovery that a much stronger bond can be effected between the steel wire ply and the embedding rubber by coating the wire with copper by electroplating either before or after weaving the wire into the screen fabric. It is theorized that an atomic bond results, during the vulcanizing heating operation, between the copper coating and the vulcanizing sulfur in the rubber.

The foregoing and other theoretical considerations, and the experimental data upon which this application is based, are set forth at great length in a bachelor's thesis entitled "The Vulcanization of Rubber by Induction Heating," submitted by co-inventor Allan Clark Morgan to the Massachusetts Institute of Technology and published thereby on June 2, 1960, which thesis and the data presented are hereby incorporated by reference as a part of this specification.

The operation of the apparatus of FIG. 1 is as follows: the unvulcanized built-up tire body 30 is laid in the mold depression 14 of the mold section 13. The inflatable pressure tube 16 is next inserted into the tire body, and the top mold section 12 is placed on and in registry with the mold section 13 so as to bring the connector parts 21 and 22 together, as shown.

The inflatable tube 16 is now supplied with steam to heat the inside of tire body 30 and to force the same into shaping engagement with the inner mold walls. Steam is also circulated through the passages 15 to heat the mold walls. Finally, high frequency current is conducted to the coil 18–19 while cooling fluid is passed therethrough.

While the invention has been disclosed as embodied in one form of article produced by one method and apparatus, it is to be understood that many changes can be made therein without departing from the spirit of the invention defined by the subjoined claims.

What is claimed is:

1. A method of making a tire comprising the steps of interleaving a plurality of highly electrically conductive reinforcing laminae with a plurality of laminae of flexible and elastic material, said reinforcing laminae each comprising a woven wire screen, the screen being formed of industrial steel wires of high tensile strength, each individual wire being coated with copper by electroplating, simultaneously applying heat and pressure to the opposite sides of the assembled laminae, and inducing a heating current in the electrically conductive laminae by means of a high frequency alternating magnetic field to produce uniform accelerated heating of the assembled laminae.

2. The method of claim 1 wherein the laminae are formed into the shape of a tire with the ends of the reinforcing laminae overlapped, the overlapped ends of the several laminae being equidistantly disposed about the periphery of the tire to maintain tire balance.

3. The method of claim 2 wherein at least three reinforcing laminae are provided with the laminae adjacent the inner and outer surfaces of the tire being formed with a coarser mesh than the intermediate layers.

References Cited by the Examiner

UNITED STATES PATENTS

| | | | |
|---|---|---|---|
| 1,216,654 | 2/1917 | Burke | 156—124 |
| 1,507,686 | 9/1924 | Root | 264—25 |
| 1,566,500 | 12/1925 | Northrup | 264—25 X |
| 1,645,704 | 10/1927 | Ledwinka | 18—6 |
| 2,129,203 | 9/1938 | Dufour et al. | 264—25 |
| 2,163,993 | 6/1939 | Dufour et al. | 219—10.75 |
| 2,438,952 | 4/1948 | Grotenhuis | 264—26 |
| 2,792,868 | 5/1957 | Benson | 156—124 X |

EARL M. BERGERT, *Primary Examiner.*

HAROLD ANSHER, *Examiner.*